United States Patent [19]

Newkirk et al.

[11] Patent Number: 5,118,647
[45] Date of Patent: Jun. 2, 1992

[54] NOVEL CERAMIC MATERIALS

[75] Inventors: Marc S. Newkirk, Newark, Del.; Steven F. Dizio, Golts, Md.

[73] Assignee: Lanxide Technology Company, LP, Newark, Del.

[21] Appl. No.: 631,229

[22] Filed: Dec. 21, 1990

Related U.S. Application Data

[60] Continuation of Ser. No. 256,257, Oct. 11, 1988, abandoned, which is a continuation of Ser. No. 13,857, Feb. 12, 1987, abandoned, which is a division of Ser. No. 818,943, Jan. 15, 1986, Pat. No. 4,713,360, which is a continuation-in-part of Ser. No. 776,964, Sep. 17, 1985, abandoned, which is a continuation-in-part of Ser. No. 705,787, Feb. 26, 1985, abandoned, which is a continuation-in-part of Ser. No. 591,392, Mar. 16, 1984, abandoned.

[51] Int. Cl.⁵ .............................................. C04B 35/10
[52] U.S. Cl. ................................... 501/127; 501/98; 501/94
[58] Field of Search ................... 501/87, 88, 92, 94, 501/96, 98, 119, 127, 128; 204/65; 75/235; 423/345, 411, 412, 418, 625

[56] References Cited

U.S. PATENT DOCUMENTS

| | | | |
|---|---|---|---|
| 1,362,237 | 12/1980 | Ros | 423/618 OR |
| 3,108,887 | 10/1963 | Lenie et al. | 501/98 X |
| 3,255,027 | 6/1966 | Talsma | 264/65 |
| 3,262,763 | 7/1966 | Bechtold | 501/98 X |
| 3,419,404 | 12/1968 | Mao | 501/98 X |
| 3,437,468 | 4/1969 | Seafert | 75/235 |
| 3,473,938 | 10/1969 | Oberlin | 264/65 |
| 3,473,987 | 10/1969 | Sowards | 501/119 |
| 3,538,231 | 11/1970 | Newkirk | 373/117 |
| 3,551,101 | 12/1970 | Matsuo et al. | 423/412 OR |
| 3,649,310 | 4/1972 | Yates | 501/92 X |
| 3,951,587 | 4/1976 | Alliegro et al. | 501/88 |
| 4,354,991 | 10/1982 | Suzuki et al. | 501/89 X |
| 4,478,785 | 10/1984 | Huseby et al. | 501/96 X |
| 4,591,537 | 5/1986 | Aldinger et al. | 501/96 X |
| 4,600,481 | 7/1986 | Sane et al. | 501/97 X |

FOREIGN PATENT DOCUMENTS

1011527  4/1983  U.S.S.R. ............................. 423/618

Primary Examiner—Karl Group
Attorney, Agent, or Firm—Mark G. Mortenson; William E. McShane

[57] ABSTRACT

Novel self-supporting ceramic structures are produced by the oxidation reaction of a molten metal precursor with a vapor-phase oxidant to form an oxidation reaction product. Molten metal is drawn through the oxidation reaction product towards the oxidant to cause continued growth of the product at the interface between oxidant and previously formed product. This reaction or growth is continued to form a thick, self-supporting ceramic body. The resulting ceramic material of the polycrystalline growth product consists essentially of an oxidation reaction product and, optionally, one or more non-oxidized constituents of the metal precursor.

3 Claims, 10 Drawing Sheets

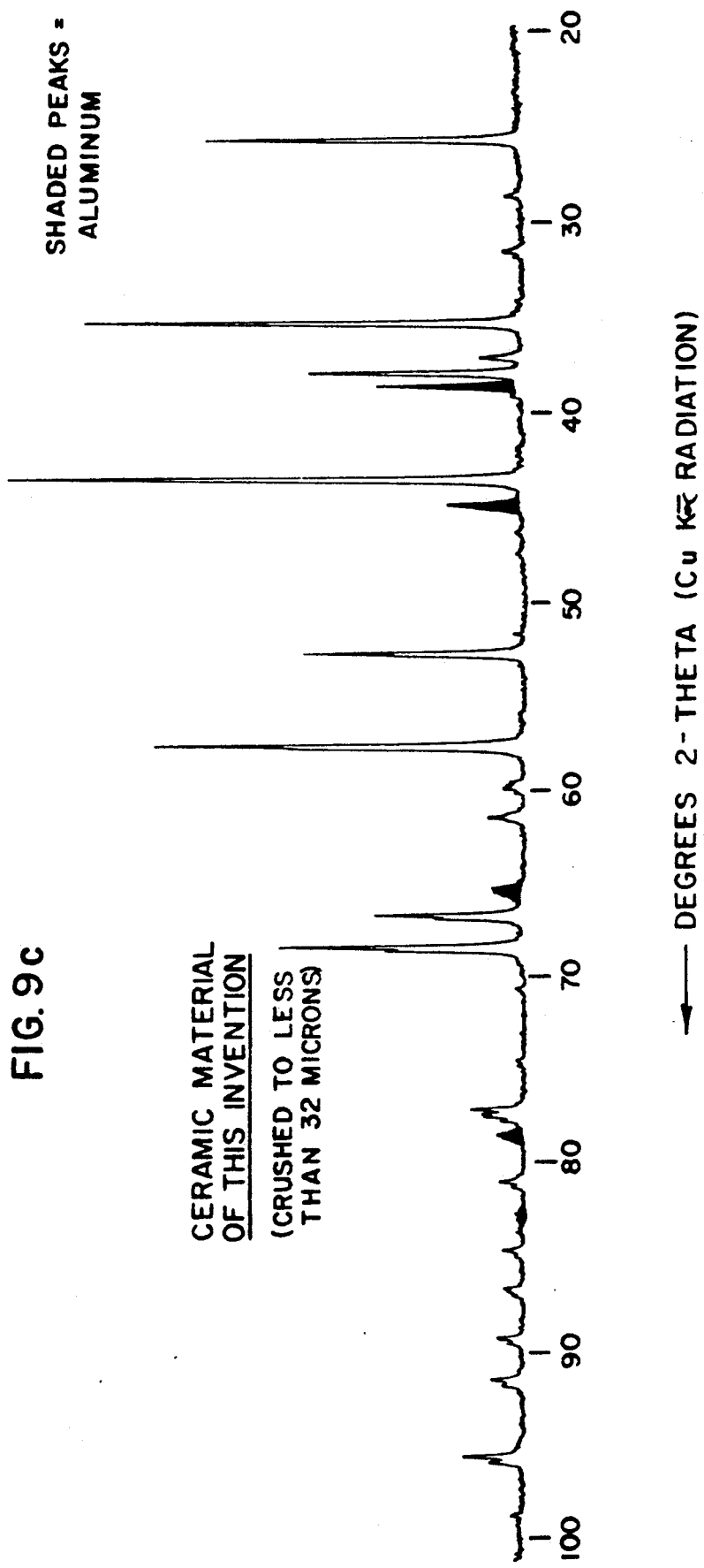

GROWTH DIRECTION →

NOVEL CERAMIC MATERIALS

CROSS REFERENCE TO RELATED APPLICATION

This is a continuation of copending application Ser. No. 07/256,257 filed on Oct. 11, 1988 now abandoned which in turn is a continuation of U.S. patent application Ser. No. 07/013,857 filed on Feb. 12, 1987 now abandoned, which in turn is a divisional of U.S. Pat. No. 4,713,360, which issued on Dec. 15, 1987, from U.S. patent application Ser. No. 06/818,943, filed Jan. 15, 1986, which is a continuation-in-part of U.S. patent application Ser. No. 06/776,964, filed Sept. 17, 1985, now abandoned, which is a continuation-in-part of U.S. patent application Ser. No. 06/705,787, filed Feb. 26, 1985, now abandoned, which is a continuation-in-part of U.S. patent application Ser. No. 06/591,392, filed on Mar. 16, 1984, now abandoned.

BACKGROUND AND SUMMARY OF THE PRESENT INVENTION

The present invention generally relates to a novel class of ceramic materials and to methods for the preparation of self-supporting ceramic materials. The ceramic materials of this invention have a unique polycrystalline structure which is strong and fracture-tough, and preferably are formed upon oxidation of a molten metal precursor with a vapor-phase oxidant.

The method by which the ceramic materials of this invention are formed is based upon the discovery of conditions which produce a surprising oxidation behavior of a metallic material. An appropriate body of metal or alloy is melted within a particular temperature envelope in a vapor-phase oxidizing atmosphere, and the liquid or molten metal forms a polycrystalline oxidation reaction product upon contact with the oxidant. With continued exposure to the process conditions, molten metal is drawn through the polycrystalline material toward the oxidizing atmosphere by a wicking or a capillary force. This transported metal forms additional oxidation reaction product upon contact with the oxidant. As the process continues, additional metal is transported through the polycrystalline formation thereby continually forming or "growing" a ceramic structure of interconnected crystallites. The resulting ceramic material optionally contains dispersed or occluded metal or alloy, which may or may not be interconnected, and whose presence depends to a greater or lesser degree upon such factors as process conditions, as explained below.

The materials of this invention can be grown with substantially uniform properties throughout their cross-section to a thickness heretofore difficult to achieve by conventional processes for producing dense ceramic structures. The process which yields these materials also obviates the high costs associated with conventional ceramic production methods, including fine uniform powder preparation, green body forming, binder burnout, and densification by sintering, hot pressing and/or hot isostatic pressing. The products of the present invention are adaptable or fabricated for use as articles of commerce such as by machining, grinding, polishing, etc. which, as used herein, is intended to include, without limitation, industrial, structural and technical ceramic bodies for such applications where electrical, wear, thermal, structural or other features or properties are important or beneficial; and is not intended to include recycle or waste materials such as might be produced as unwanted by-products in the processing of molten metals. Such ceramic bodies include, for example, engine components, heat exchangers, kiln furniture, cutting tools, abrasives, valve components, pump components, bearings, seals, dies, diffusion tubes, mufflers, tiles, radiation barriers, etc.

Ceramics have, in recent years, been increasingly considered as candidates for structural applications historically served by metals. The impetus for this substitution has been the superior properties of ceramics, such as corrosion resistance, hardness, modulus of elasticity, and refractory capabilities when compared with metals, coupled with the fact that the engineering limits of performance of many modern components and systems are now gated by these properties in conventionally employed materials.

However, the key to substituting ceramics for metals in such structural applications has been the cost-effective development of strength and fracture toughness characteristics sufficient to withstand tensile loading, vibration and impact. Current efforts at producing high strength, reliable monolithic ceramics have focused upon improved powder processing technologies, and although these efforts have resulted in improvements in ceramic performance, they are also complicated and generally less than cost-effective. The emphasis in such technologies has been in two areas: (1) improved methods of producing ultra-fine, uniform powder materials using sol-gel, plasma and laser techniques, and (2) improved methods of densification and compaction, including superior techniques for sintering, hot pressing and hot isostatic pressing. The object of these efforts is to produce dense, fine-grained, flaw-free microstructures and, in fact, some improvement in performance capabilities in ceramics has been attained in some areas. However, these developments tend to result in dramatic increases in the cost of producing ceramic structures.

One limitation in ceramic engineering which is aggravated by trends in modern ceramic processing is scaling versatility. Conventional processes aimed at densification (i.e., removal of voids between powder particles) are incompatible with large, one-piece structural application possibilities for ceramics such as monolithic furnace liners, pressure shells, boiler and superheater tubes, etc. Several practical problems are encountered in the conventional processing of ceramic parts with an increase in part size. The problems include, for example, increased process residence times, stringent requirements for uniform process conditions over a large process volume, cracking of parts due to non-uniform densification if conditions are not sufficiently uniform, excessive compaction forces and die dimensions if hot pressing is used, and excessive pressure vessel costs due to internal volume and wall thickness requirements in the case of hot isostatic pressing.

The present invention overcomes these difficulties by producing dense, high strength and fracture-tough ceramic microstructures by a mechanism which is more direct and less expensive than conventional approaches.

The present invention also provides means for reliably producing ceramic materials based on oxidation reaction products of a size and thickness which is virtually impossible to duplicate with the presently available technology.

As used in this specification and the appended claims "oxidation reaction product" means one or more metals in any oxidized state wherein a metal has given up electrons to or shared electrons with another element, compound, or combination thereof. Accordingly, an "oxidation reaction product" under this definition includes the product of the reaction of one or more metals with an oxidant such as oxygen, nitrogen, a halogen, sulphur, phosphorus, arsenic, carbon, boron, selenium, tellurium and compounds and combinations thereof, for example, methane, ethane, propane, acetylene, ethylene, propylene, and mixtures such as air, $H_2/H_2O$ and $CO/CO_2$, the latter two (i.e., $H_2/H_2O$ and $CO/CO_2$) being useful in reducing the oxygen activity of the environment. Although the present invention is hereinafter described with particular emphasis on aluminum and specific embodiments of aluminum as the parent metal, this reference is for exemplary purposes only, and it is to be understood that other metals such as zirconium, titanium, silicon, tin, etc. also can be employed which meet the criteria of the invention.

The process of this invention relies upon a surprising oxidation characteristic of metals, and, therefore, it may be useful to review briefly what is known about the general oxidation behavior of metals and the previous limited use of metal oxidation as a mechanism for generating ceramic bodies.

Metals oxidize generally in one of four modes.

Certain metals oxidize upon exposure to an oxidizing environment and form an oxide which flakes, spalls or is so porous that the metal surface is continually exposed to the oxidizing environment. In such a process, a free-standing oxide body is not formed but, instead, a mass of oxide flakes or particles is formed. Iron, for example, oxidizes in such a manner.

Certain other metals such as aluminum, magnesium, chromium, nickel or the like oxidize in such a manner as to form a relatively thin, protective oxide skin which transports either oxygen or metal at such a low rate that the underlying metal is effectively protected from further oxidation. This mechanism does not yield a free-standing oxide structure of any significant structural integrity.

Still other metals are known to form a solid or liquid oxide film which does not protect the underling parent metal because such oxides permit the transport of oxygen. While an oxygen-permeable film may retard the oxidation rate of the underlying metal, the metal itself is not totally protected by the film due to oxygen-permeability. Silicon is an example of a metal which exhibits this type of oxidation behavior, and when exposed to air at elevated temperatures, forms a glassy skin of silicon dioxide which is permeable to oxygen. Typically, these processes do not occur at nearly fast enough rates to produce a useful thickness of ceramic oxide material.

There also are metals which, upon oxidation, volatilize oxide reaction product thereby continually exposing fresh metal to oxidation. Tungsten is an example of a metal which oxidizes in this manner.

In an attempt to produce ceramics of greater thickness, fluxes have been added to the surfaces of metals such as aluminum and magnesium to dissolve or break up their oxides and render them susceptible to oxygen or metal transport so that thicker oxide skins can be produced. However, the ability to form free-standing oxide structures by such a technique is still limited to thin sections of relatively limited strength.

The use of this technique with admixtures of metal powders and other particulates to afford intrinsically porous, low strength ceramics is described by H. Talsma in U.S. Pat. No. 3,255,027 and W. A. Hare in U.S. Pat. No. 3,299,002.

Similar methods for producing thin-walled aluminum oxide refractory structures are also described by D. R. Sowards in U.S. Pat. No. 3,473,987 and R. E. Oberlin in U.S. Pat. No. 3,473,938, and L. E. Seufert discloses in U.S. Pat. No. 3,298,842 an analogous method for producing thin-walled hollow refractory particles.

However, one disadvantage with these prior art processes is the limited thickness of oxide formed, apparently because the effect of the fluxing agent is of relatively short duration so that the oxide becomes slow-growing and assumes a protective character after only a limited amount of oxide growth. Increasing the flux concentration to promote thicker oxide growth is counterproductive because it results in a product which is lower in strength, refractoriness, and hardness.

One technique which has been successfully employed to create free-standing ceramics by the oxidation of metals involves an oxidation/reduction or "redox" type reaction. It has long been known that certain metals will reduce other metal oxides to form a new oxide and, also, a reduced form of the original oxide. The use of such redox-type reactions to produce ceramic materials is described in U.S. Pat. Nos. 3,437,468 to L. E. Seufert and 3,973,977 to L. E. Wilson. An important disadvantage of the redox-type reactions described in these patents is their inability to produce a singular, hard, refractory oxide phase as a reaction product, but rather the products contain multiple oxide phases which degrade the hardness, modulus of rupture and wear resistance characteristics.

The present invention involves a unique and novel oxidation phenomenon which differs from any of the classical oxidation modes and which overcomes the difficulties and limitations associated with known processes.

The invention will now be described by reference to the Drawings.

BRIEF DESCRIPTION OF THE DRAWINGS

FIGS. 9a, 9b and 9c are X-ray diffraction patterns for α-alumina, elemental aluminum and a ceramic product prepared according to Example 2, respectively.

DESCRIPTION OF THE INVENTION

Figure 1:
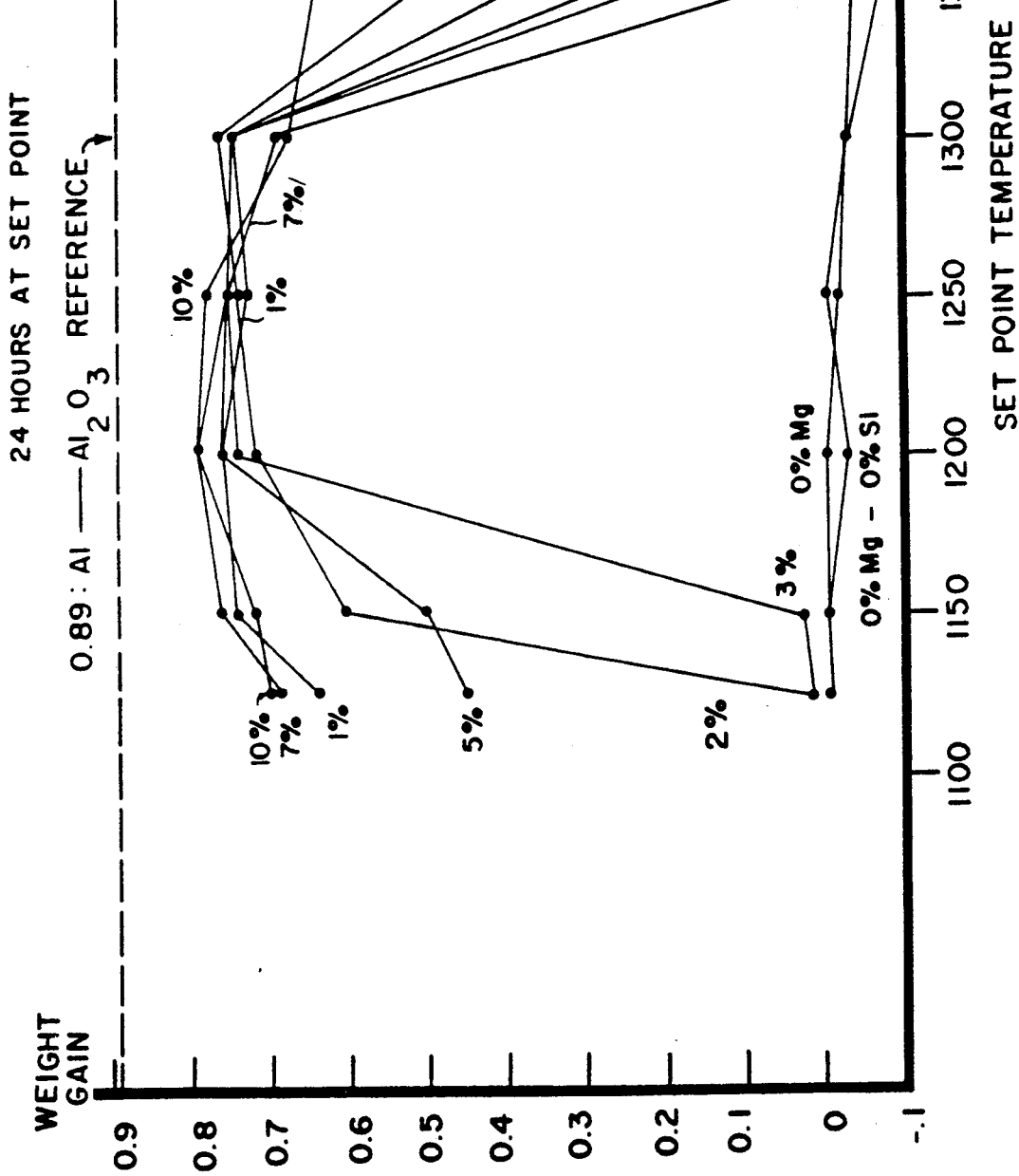
FIG. 1 is a graph depicting weight gain ratios (as defined below) for an α-alumina ceramic obtained from aluminum containing 3% silicon and 0-10% magnesium at selected furnace setpoint temperatures, prepared according to Example 1.

In accordance with the present invention, a self-supporting ceramic body is produced by oxidation of a molten parent metal to form a polycrystalline material consisting essentially of the oxidation reaction product of said parent metal with a vapor-phase oxidant and, optionally, one or more unoxidized constituents of the parent metal. The term "ceramic" as used in this specification and the appended claims is not limited to a ceramic body in the classical sense, that is, in the sense that it consists entirely of non-metallic and inorganic materials but, rather, it refers to a body which is predominantly ceramic with respect to either composition or dominant properties, although the body may contain minor or substantial amounts of one or more metals derived from the parent metal, most typically within a range of from about 1-40% by volume, but may include still more metal. The term "parent metal" as used in this specification and the appended claims refers to that metal, e.g. aluminum, which is the precursor for the polycrystalline oxidation reaction product, and includes that metal as a relatively pure metal, a commercially available metal with impurities and/or alloying constituents, or an alloy in which that metal precursor is the major constituent; and when a specific metal is mentioned as the parent metal, e.g. aluminum, the metal identified should be read with this definition in mind unless indicated otherwise by the context.

The parent metal, which is the precursor to the oxidation reaction product, is formed into an ingot, billet, rod, plate, or the like, and placed in an inert bed, crucible or other refractory container, with one or more of the metal surfaces exposed to a vapor phase oxidizing environment. The metal is heated above its melting point but below the melting point of the oxidation reaction product, but it should be understood that the operable range or preferred temperatures may not extend over this entire temperature interval. At this temperature or within this temperature range, a body or pool of molten metal forms, and on contact with the oxidant, the molten metal will react to form a layer of oxidation reaction product. Upon continued exposure to the oxidizing environment, the remaining molten metal is progressively drawn into and through the oxidation reaction product in the direction of the oxidant so as to cause continued growth of the polycrystalline material at or near the solid-vapor interface. The resulting ceramic product produced by the oxidation of the parent metal to form a polycrystalline material consists essentially of the oxidation reaction product of the parent metal with the vapor-phase oxidant and, optionally, one or more non-oxidized constituents of the parent metal. It should be understood that the resulting polycrystalline material may exhibit porosity which may be a partial or nearly complete replacement of the metal phase, but the volume percent of voids will depend largely on such conditions as temperature, time, and type of parent metal. Typically in these polycrystalline ceramic structures, the reaction product crystallites are interconnected preferably in three dimensions, and the metal may be at least partially interconnected.

By way of explanation of the process of the present invention but not wishing to be bound thereby, the molten metal is transported along channels at certain high energy grain intersections of the oxidation reaction product phase. It is well understood that any polycrystalline material exhibits a range of grain boundary energies (surface free energies) depending upon the degree of angular misalignment at the interface between two adjacent crystals or grains of the same material. In general, grain boundaries of low angular misalignment exhibit low surface energies, while high angle boundaries have high surface energies, although the relationship may not be a simple, monotonically increasing function of the angle due to the occasional occurrence of more favorable atomic alignments at intermediate angles. Similarly, the lines along which three grains intersect also typically are high energy features in a polycrystalline microstructure.

The parent metal and oxidant apparently form a favorable polycrystalline oxidation reaction product having a surface free energy relationship with the molten parent metal such that within some portion of a temperature region in which the parent metal is molten, at least some of the grain intersections (i.e. grain boundaries or three-grain-intersections) of said polycrystalline oxidation reaction product are replaced by planar or linear channels of molten metal. For example, consider a grain boundary having a surface free energy greater than the alternative configuration of two substantially geometrically equivalent crystal/molten metal interface boundaries. In these circumstances, such a high energy grain boundary either will not form or will spontaneously decompose in favor of a planar channel of molten metal bounded by two crystal/metal interfaces. When the molten metal is maintained in the oxidizing environment and within the effective portion of the temperature region, molten metal is drawn or transported along such channels in the direction of the oxidant. More specifically, this phenomenon occurs when (1) the liquid metal wets the crystalline oxidation reaction product phase (i.e., $\gamma_{SL} < \gamma_{SG}$, where $\gamma_{SL}$ denotes the surface free energy of the crystal/molten metal interface and $\gamma_{SG}$ denotes the surface free energy of the crystal/vapor interface), and (2) the energy of some of the grain boundaries, $\gamma_B$, is greater than twice the crystal/liquid metal interfacial energy, i.e. $\gamma_{BMAX} > 2\ \gamma_{SL}$ where $\gamma_{BMAX}$ is the maximum grain boundary energy of the polycrystalline material. Molten metal channels of linear character can be formed in a similar way if metal replaces some or all of the three-grain-intersections in the material.

Since the channels are at least partially interconnected (i.e., the grain boundaries of the polycrystalline material are interconnected), molten metal is transported through the polycrystalline oxidation reaction product to its surface into contact with the oxidant atmosphere, where the metal undergoes oxidation resulting in the continual growth of the oxidation reaction product. Furthermore, since the wicking of molten metal along channels is a much faster transport process than the ionic conduction mechanisms of most normal oxidation phenomena, the growth rate observed for the oxidation reaction product with the process of the present invention is much faster than that typically observed in other oxidation phenomena.

While the oxidation reaction product of the present invention is interpenetrated by metal along high energy grain intersections, the polycrystalline reaction product phase is itself interconnected in one or more dimensions, preferably in three dimensions, along relatively low angle grain boundaries which do not meet the criterion $\gamma_B > 2 \gamma_{SL}$. Thus the product of this invention exhibits many of the desirable properties of the classical ceramic (i.e., hardness, refractoriness, wear resistance, etc.) while deriving additional benefits from the presence of the distributed metal phase (notably higher toughness and resistance to fracture).

Certain parent metals under specific conditions of temperature and oxidant atmosphere meet the criteria necessary for the oxidation phenomenon of the present invention with no special additions or modifications. However, as a further embodiment of the invention, the addition or alloying of dopant materials in the parent metal can favorably influence or promote the oxidation reaction process. While not wishing to be bound by any particular theory or explanation of the function of the dopants, it appears that some of them are useful in those cases where appropriate surface energy relationships between the parent metal and its oxidation reaction product do not intrinsically exist. Thus, certain dopants or combinations of dopants, which reduce the solid-liquid interfacial energy, will tend to promote or accelerate the development of the polycrystalline structure formed upon oxidation of the metal into one containing channels for molten metal transport, as required for the new process. Another function of the dopant materials may be to initiate the ceramic growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth phenomenon of the present invention, but such dopants may be important in reducing any incubation period for the initiation of such growth to within commercially practical limits for certain parent metal systems.

It should be understood, however, that whether a particular dopant enables, accelerates, or initiates the growth phenomenon, its function or functions can depend upon a number of factors other than the dopant material itself. These factors include, for example, the particular parent metal, the end product desired, the particular combination when two or more dopants are used, the oxidation environment, and the process conditions. Still further, certain dopants appear to have a dual function which can vary depending upon these different factors. Although the present invention attempts to explain the roles of these dopants, and certain preferred embodiments are described below with this explanation in mind, it should be recognized that the precise behavior may not be completely understood, and the performance or function of any one dopant can vary depending upon the circumstances.

Another important feature of this invention is the ability to influence and control the microstructure and properties of the resultant ceramic products by modifying the surface energies. Thus, for example, maintaining process conditions which decrease the solid/liquid interface energy relative to the range of energies of grain boundaries and three-grain-intersections in the oxidation reaction product will produce a structure which contains an increased amount of metal and a reduced degree of interconnectivity of the oxidation reaction product phase, whereas, a change of relative surface energies in the opposite direction produces a more interconnected oxidation reaction product structure with less metal phase (i.e., fewer metal transport channels are formed). Such changes may be effected, for example, by changing the nature or concentration of the dopants or by changing the oxidation environment (temperature or atmosphere). As a consequence of this process feature, the properties of the resultant material can be tailored to a relatively high degree from properties approaching those of a pure ceramic to properties (such as toughness and electrical conductivity) which are highly influenced by the presence of 25 or 30 percent by volume or more of the metal phase.

DETAILED DESCRIPTION OF THE PREFERRED EMBODIMENTS

In accordance with the method of this invention, a parent metal maintained at a temperature above the melting point of said metal but below the melting point of the oxidation reaction product, is reacted with a vapor-phase oxidant to form on oxidation a polycrystalline material. As described above, molten metal is transported through the polycrystalline material in the direction of the oxidant, thereby resulting in continued growth of the ceramic body. In a preferred embodiment, particularly in the oxidation of aluminum, certain dopants, when added or alloyed in the parent metal, favorably influence the process whereby molten metal is drawn through the polycrystalline material toward the oxidizing atmosphere. At least a portion of the oxidation reaction product is maintained in contact with and between the body of molten metal and the oxidant. Molten metal continues to be drawn through its own oxidation reaction product where it contacts the oxidizing atmosphere and forms additional oxidation reaction product. Accordingly, the ceramic bodies produced by this invention can be grown to any desired thickness or other dimensions and, where desired, with substantially uniform properties tailored for specific applications. The procedure can be continued, or growth continued, until at least one of the following occurs: (1) the parent metal has been converted into the polycrystalline material, i.e. substantially all of the parent metal is consumed; (2) the oxidizing atmosphere has been exhausted, depleted, evacuated, or replaced by a nonoxidizing atmosphere: or (3) the reaction temperature is altered to be outside the reaction temperature envelope, e.g. lowered below the melting point of the parent metal. Usually, the temperature is reduced by lowering the furnace temperature, and then the material is removed from the furnace.

The ability of the molten metal to be drawn continually through its oxidation reaction product from a molten body or pool is a surprising development, especially when one considers that certain metals such as aluminum normally form oxidation films which protect the substrate metal from further oxidation. In the case of aluminum having an oxide film, this normal protection from oxidation applies not only to the solid metal but, also, to liquid aluminum which remains protected up to the melting point of its oxide, that is, up to about 2050° C.

Although the invention is described hereafter with particular emphasis on aluminum, it is understood that other metals such as silicon, tin, titanium and zirconium which meet the criteria of the invention are also applicable.

In some cases, it is particularly useful or necessary to incorporate certain dopants in the parent metal, which initiate, accelerate, enhance or promote the formation of channels for metal transport within the polycrystalline material. The dopants which make this metallic transport possible are, as in the case of aluminum, alloyed into the parent metal. A single dopant material may be used, or a combination of dopants may be used, and in varying concentrations and proportions, depending upon such factors as parent metal and process conditions.

Useful dopants for an aluminum parent metal, particularly with air as the oxidant, include, for example, magnesium metal and zinc metal, preferably in combination with each other or singly or together in combination with other dopant(s) described below. These metals, or a suitable source of the metals, are alloyed into the aluminum-based parent metal at temperatures preferably below about 900° C., and may be at concentrations for each of between about 0.1-10% by weight based on the total weight of the resulting doped metal. Concentrations within the appropriate range for magnesium and zinc appear to initiate the ceramic growth, enhance metal transport and favorably influence the growth morphology of the resulting oxidation reaction product.

Other dopants which are effective in promoting polycrystalline oxidation reaction product growth for aluminum-based parent metal systems are, for example, silicon, germanium, tin and lead, especially when used in combination with magnesium or zinc. One or more of these other dopants, or a suitable source of the desired dopant or dopants, is alloyed into the aluminum parent metal system to produce a concentration for any one such dopant of from about 0.5 to about 15% by weight of the total alloy; however, more desirable growth kinetics and growth morphology are obtained with a dopant concentration in the range of from about 1-10% by weight of the total parent metal alloy. Lead as a dopant is generally alloyed into the aluminum based parent metal at a temperature of at least 1000° C. so as to make allowances for its low solubility in aluminum; however, the addition of other alloying components, such as tin, will generally increase the solubility of lead and allow the alloying materials to be added at a lower temperature. One or more dopants may be used depending upon the circumstances, as explained above. For example, in the case of aluminum with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range from about 1 to about 6% by weight, and for silicon in the range of from about 1 to about 10% by weight.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be used in very small amounts, even in the parts per million range, as low as about 100-200 parts per million, and each may be used alone or together, or in combination with other dopant(s). Rare earth elements such as cerium, lanthanum, praeseodymium, neodymium and samarium are also useful dopants, and here again especially when used in combination with other dopants.

In practice, the procedure of this invention typically includes alloying the dopant(s) into the parent metal and placing the doped metal into a crucible or other refractory container with a portion of the metal surface exposed to the oxidizing atmosphere. The container and its contents are then placed into a furnace and heated to temperatures above the melting point of the parent metal. In the case of aluminum in air, the setup is heated to a temperature between about 850°-1450° C., and more preferably between about 900°-1350° C. It should be understood, however, that the operable temperatures or preferred temperature ranges can vary depending upon such factors as parent metal, dopant(s), time, and oxidant. At these temperatures, the parent metal is melted, and oxidation reaction product is formed on contact with the oxidizing gas. By maintaining these temperatures, the molten metal will continue to be drawn toward the oxidizing atmosphere through any previously formed oxidation reaction product, and thus form a progressively thicker oxidation reaction product. Moreover, this structure will continue to grow at a substantially constant rate so long as the furnace is provided with an interchange of oxidizing gas. When the oxidizing atmosphere is air, this oxygen interchange is effected most conveniently by providing venting means within the furnace.

The polycrystalline ceramic bodies produced according to this invention are characterized by a microfine network of metal. This metal appears to be along what would otherwise constitute high energy grain intersections. The polycrystalline oxidation reaction product phase is highly interconnected in one or more dimensions, preferably in three dimensions. The metal phase is also interconnected, at least to a certain extent, but the metal is not required as a binder for the crystallites which are bonded directly to one another. When the process is taken to completion, that is, when the metal phase has been completely oxidized or nearly completely oxidized, the interconnected metal constituent is drawn from the body leaving porosity in its place to form additional ceramic on the surface. These process features and product characteristics are consistent with the ability to create wide variations of electrical conductivity which have been observed with the end products, as demonstrated in Example 2.

The ceramic oxidation products of this invention are distinct from classical cermets. A classical cermet is a composite of non-interconnected ceramic grains bonded together by a metallic phase, and its physical properties reflect the presence of the continuous metal and discontinuous ceramic constituents. Thus, for example, a cermet typically loses all its strength at the melting point of the metallic constituent. Because of the interconnected nature of the oxidation reaction product of the materials of this invention, such materials would be expected to retain significant strength well above the melting point of the metallic constituent.

The electrical conductivities of the products of this invention depend upon such factors as the dopants employed, processing temperatures and the oxidizing atmosphere. These conductivities range from less than 0.05 Ohm resistance per inch of length in a 0.5 inch square cross-section bar to 10 Megohms resistance per inch in a similarly dimensioned bar, and a summary of this data can be found in Example 2 (Table 7).

The present invention makes it possible to produce a nearly void-free ceramic product, and usually if the process is not conducted beyond the exhaustion of the parent metal, the product obtained is nearly fully dense. If the process is taken to completion in that the parent metal has been exhausted and the metallic phase initially formed in the ceramic body is nearly completely oxidized, the product will exhibit a higher volume percent of voids which are at least partially interconnected. For example, a ceramic body formed from aluminum processed in air at about 1125° C. may contain about 20-30 volume percent metal and about 2-5 volume percent voids when growth is stopped before all the metal is oxidized; and if processed to oxidize nearly all the metal, may contain about 1-3 volume percent parent metal and 25-30 volume percent voids when the process is run to completion.

The ceramic body of this invention, preferably formed upon oxidation of a molten metal precursor with a vapor-phase oxidant, comprises a polycrystalline oxidation reaction product of a metal precursor, and is characterized by an essentially single phase ceramic skeletal structure (the oxidation reaction product) and one or more nonoxidized constituents of the metal precursor or voids or both. The angular mismatch between neighboring ceramic crystallite lattices at the grain boundaries is typically less than 5 degrees. Metal channels are formed where high misorientation between the crystal lattices of adjacent grains has occurred.

Figure 13:
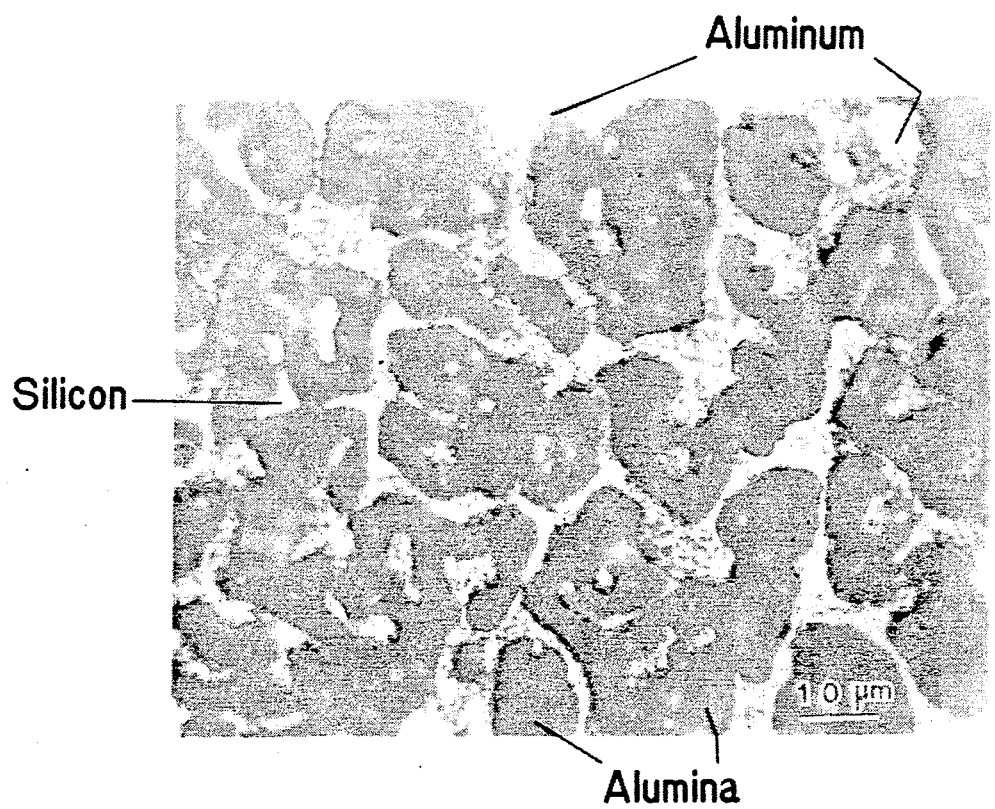
FIG. 13 is a photomicrograph of an α-alumina ceramic prepared as by Example 2, magnified 1000 times.

In certain embodiments of this invention, the product exhibits a predominance of substantially arcuate interface boundaries between crystallites and nonoxidized metal or between crystallites and voids, or both. FIG. 13 is a photomicrograph of an α-alumina product produced according to Example 2 and magnified 1000 times. It will be observed from FIG. 13 that the interface boundaries between crystallite and metal, and between crystallite and void, are substantially arcuate in that they weave or form a tortuous microstructure through the network. In single phase ceramic materials of the prior art, interfaces are substantially faceted, that is, more angular and ragged. A product having a predominance of arcuate or rounded interface boundaries, as in the product of the present invention, may be particularly advantageous for certain applications because one would expect a lower degree of stress concentration and a lower elastic modulus than from a typical interconnected ceramic structure that did not have this type of arcuate structure.

In another important feature, the ceramic products of the present invention have an essentially single phase, interconnected, ceramic skeletal structure wherein the grain boundaries at the interconnection of the crystallites have no other phase present. The formation of such ceramic products by sintering is either difficult or impossible because impurities in a sintering process tend to be deposited at grain boundaries. Such impurities may be present either unintentionally or as deliberate additions to promote sintering or to restrict grain growth during high temperature processing. The absence of extraneous grain boundary phases in a product of this character is significant because it affords superior properties such as high temperature strength retention and creep resistance. Still further, the room temperature fracture of alumina materials of this invention is observed to be intragranular, which is in sharp contrast to dense sintered alumina, for example, where fracture is intergranular. That is, the ceramic body exhibits an intragranular fracture mode in the skeletal structure.

In one embodiment, the product of this invention is characterized by a substantially columnar macrostructure having cellular pattern boundaries substantially normal to the vertical axis of the column. If the metal phase has not been exhausted from the ceramic product, it is the ceramic regions with interconnected metal that form the boundaries of the columns; but if the growth process is conducted to completion, the interconnected metal is drawn from the boundaries, leaving behind porosity. This macrostructure is the result of the directed growth phenomenon of this invention which provides for the interconnectivity of the metal phase or voids. This interconnectivity can be of value in that it may enhance certain properties of the ceramic product such as electrical or thermal conductivity.

In magnesium-doped systems where the parent metal is aluminum and the oxidizing medium is air or oxygen, it has been discovered that magnesium is at least partially oxidized out of the alloy at temperatures of from about 820°-950° C. In such instances the magnesium forms a magnesium oxide and/or magnesium aluminate spinel phase at the surface of the molten aluminum alloy and during the growth process the spinel phase remains primarily at the initial oxide surface of the parent metal alloy (i.e., the "initiation surface") in the growing ceramic structure. Where desired, this initiation surface can be readily removed as by grinding, machining, grit blasting or polishing. The resulting body is a substantially monolithic ceramic, e.g. an α-alumina ceramic with metal or voids or both, as described above.

Various initiation surfaces of the ceramic materials of this invention have been examined by X-ray diffraction using CuKα radiation and the results of this study confirm the presence of spinel, as shown by the representative pattern in Table 1 below.

TABLE 1

Spinel Comparison

| Spinel Measurements | | Measurement of Initiation Surface for a Ceramic Product of this Invention | |
|---|---|---|---|
| dA | I/I$_1$ | dA | I/I$_1$ |
| 4.66 | 35 | | |
| 2.858 | 40 | 2.071 | 40 |
| 2.437 | 100 | 2.445 | 100 |
| 2.335 | 4 | 2.331 | 2 |
| 2.020 | 65 | 2.025 | 72 |
| 1.650 | 10 | 1.652 | 11 |
| 1.5554 | 45 | 1.557 | 55 |
| 1.4289 | 55 | 1.430 | 80 |
| 1.3662 | 4 | 1.366 | 3 |
| 1.2780 | 4 | 1.279 | 3 |
| 1.2330 | 8 | 1.233 | 11 |
| 1.2187 | 2 | 1.219 | 1 |
| 1.1666 | 6 | 1.167 | 8 |
| 1.1320 | 2 | 1.052 | 21 |
| 1.0802 | 6 | 1.080 | 7 |

TABLE 1-continued

Spinel Comparison

| Spinel Measurements | | Measurement of Initiation Surface for a Ceramic Product of this Invention | |
|---|---|---|---|
| dA | I/I₁ | dA | I/I₁ |
| 1.0524 | 12 | 1.052 | 21 |
| 1.0104 | 8 | 1.010 | 12 |
| .9427 | 2 | .952 | 3 |
| .9334 | 8 | .933 | 15 |
| .9274 | 2 | .927 | 1 |
| .9038 | 6 | .903 | 13 |
| .8872 | 2 | .886 | 1 |
| .8820 | <2 | | |
| .8616 | <2 | .861 | <1 |
| .8474 | 8 | .846 | 14 |
| .8249 | 18 | | |

Figure 10:
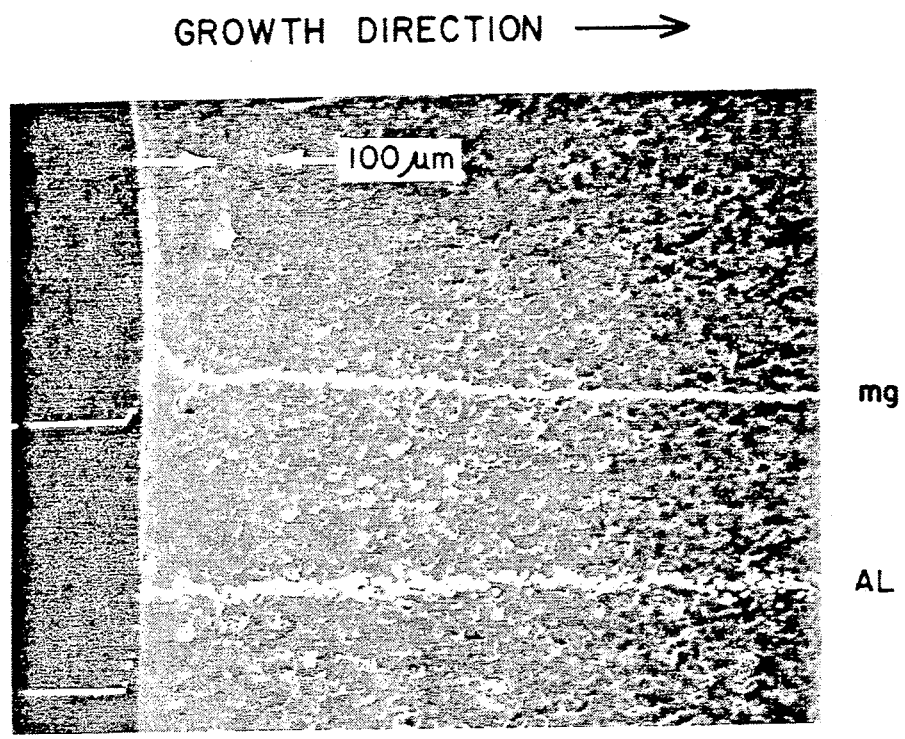
FIG. 10 is a scanning electron photomicrograph of a ceramic prepared according to the present invention showing the distribution of magnesium and aluminum as determined by energy dispersive X-ray analysis.

FIG. 10 is a photomicrograph showing the distribution of magnesium and aluminum in an α-alumina product of this invention as determined by energy dispersive X-ray analysis. The peak for magnesium in the initiation layer results from the spinel phase, and the essentially flat line (Mg) which extends from this peak indicates there is essentially no magnesium in the remainder of the product. The essentially flat band identified as "Al" is evidence that aluminum is present in a consistently high concentration either as aluminum metal or aluminum oxide.

When the parent metal in this invention is an aluminum alloy with magnesium as a dopant and air or oxygen is the oxidant, an aluminum oxide-based structure is produced apart from the relatively thin layer of magnesium aluminate spinel at the initiation surface. Non-functional alloy constituents in the parent metal, especially those which exhibit a less negative free energy of formation for their oxides than aluminum oxide, become concentrated in the metallic inclusion phases. Manganese, iron, copper, tungsten and other metals are common alloy diluents or impurities which in minor amounts are compatible and do not interfere with the growth mechanism of the ceramic structure.

The following examples illustrate the novel oxidation reaction products of this invention and the method by which they are prepared, however, these examples are illustrative only and they are not intended to limit the invention claimed.

In the following examples (but not in the claims), "aluminum" means aluminum having a nominal purity of 99.7% with iron and silicon constituting the major impurities, unless the aluminum is identified by alloy number. All concentrations are in a percent by weight relationship, and nominal compositions only are provided for the alloying constituents.

EXAMPLE 1

α-Alumina Ceramic; Effect of Magnesium (with Fixed Silicon)

Cylindrical ingots of aluminum, each measuring ⅞ inch in length and 1 inch in diameter, were prepared from material alloyed to contain 3% silicon and 0–10% magnesium. Each ingot was embedded in 38 Alundum, 220 mesh, manufactured by Norton Company, an aluminum oxide grain which acts as an inert container for the molten aluminum in that the molten aluminum does not penetrate or react with this material under the described process conditions. This bed was contained in a refractory crucible, and an end face of the aluminum ingot (one ingot per crucible) was located substantially flush with the surface of the bed approximately ¼ inch below the crucible opening.

The crucibles and their contents were each weighed and placed into a furnace where they were heated in air to their respective setpoint temperatures and then cooled according to the following cycle.

| Elapsed Time (Period) | | Temperature: °C. |
|---|---|---|
| 0–5 | Hours (5 Hrs.) | From 30 to Setpoint Temp. |
| 5–29 | Hours (24 Hrs.) | Setpoint Temp. |
| 29–43 | Hours (14 Hrs.) | From Setpoint Temp. to 600 |
| 43+ | Hours | From 600 to Ambient (rapid cooling in air) |

After the crucibles and their contents had cooled, they were again weighed, the difference between their respective pre-firing weights and post-firing weights were determined, and their weight gain ratios were calculated as follows:

$$\frac{\text{Post-Firing Weight} - \text{Pre-Firing Weight}}{\text{Pre-Firing Weight of Ingot}} = \text{Weight Gain Ratio}$$

The weight gain ratio for each concentration tested was compared against the theoretical maximum of 0.89 for complete conversion of aluminum to α-alumina. X-ray diffraction analysis confirmed that the product obtained was essentially α-alumina and aluminum. Weight gain ratio is a direct measure of conversion of metal to ceramic product by the process of this invention.

The results of this study are listed in Table 2. All ratios indicate the approximate yield of α-alumina, uncorrected for other possible effects including the formation of minor amounts of spinel (observed only in the initiation layer for those samples containing magnesium) and small differences due to adsorption/desorption of moisture from the bed particle surfaces.

TABLE 2

Weight Gain Ratio
Aluminum (99.7% Pure) Containing
3% Si and 0–10% Mg

| Temp: °C. | 0% Mg | 1% Mg | 2% Mg | 3% Mg | 5% Mg | 7% Mg | 10% Mg |
|---|---|---|---|---|---|---|---|
| 1125 | −0.01 | 0.64 | 0.01 | 0.01 | 0.45 | 0.68 | 0.70 |
| 1150 | −0.01 | 0.74 | 0.60 | 0.02 | 0.50 | 0.76 | 0.72 |
| 1200 | −0.01 | 0.76 | 0.72 | 0.74 | 0.76 | 0.79 | 0.79 |
| 1250 | −0.02 | 0.73 | 0.74 | 0.75 | 0.73 | 0.75 | 0.78 |
| 1300 | −0.04 | 0.75 | 0.76 | 0.75 | 0.75 | 0.69 | 0.68 |
| 1350 | −0.08 | 0.36 | 0.49 | 0.23 | 0.18 | 0.02 | 0.64 |
| 1400 | −0.06 | 0.10 | 0.22 | 0.20 | 0.06 | −0.02 | 0.65 |

The foregoing furnace runs also included ingots of aluminum with no added magnesium and/or silicon as dopant. The weight gain ratios for the aluminum ingots were small negative values at all setpoint temperatures demonstrating no growth. The results of this study are set forth in Table 3.

TABLE 3

| Weight Gain Ratios Aluminum (99.7% Pure): 0% Si and 0% Mg Weight Gain v. Setpoint Temperature | | | | | | | |
|---|---|---|---|---|---|---|---|
| Temperature °C.: | 1125 | 1150 | 1200 | 1250 | 1300 | 1350 | 1400 |
| Wt. Gain Ratio: | −0.00 | −0.00 | −0.03 | −0.01 | −0.03 | −0.04 | −0.01 |

A graphic illustration of the relative weight gain ratios for all samples listed, including the aluminum sample, is shown in FIG. 1.

These studies demonstrate that aluminum alloyed with 3% silicon and 1–10% magnesium dopants provided greatly enhanced yields of α-alumina; pure aluminum or aluminum alloyed with silicon alone was not effective for ceramic production in these runs by the method of this invention.

In Examples 2–6, runs were conducted with aluminum as the parent metal and using dopant elements from Group IVB of the Periodic Table (except carbon) in conjunction with magnesium.

EXAMPLE 2

α-Alumina Ceramic: Effect of Silicon (with Fixed Magnesium)

Cylindrical ingots of aluminum each measuring ⅞ inch in length and 1 inch in diameter were prepared from material alloyed to contain 2% magnesium and 1–10% silicon. Each ingot was embedded in 38 Alundum, 220 mesh, contained in a refractory crucible with an end face of the ingot placed substantially flush with the surface of the aluminum oxide bed approximately ¼ inch below the crucible opening.

The crucibles and their contents were each weighed and placed into a furnace where they were subjected to heating in the presence of air and cooling identical to that which is described in Example 1.

The weight gain ratio for each concentration tested was determined as described in Example 1, and the results are listed in Table 4.

TABLE 4

| Weight Gain Ratios Aluminum (99.7% Pure) Containing 2% Mg and 1–10% Si | | | | | |
|---|---|---|---|---|---|
| Temp: °C. | 1% Si | 3% Si | 5% Si | 7% Si | 10% Si |
| 1125 | 0.00 | 0.00 | 0.00 | 0.00 | 0.26 |
| 1150 | 0.12 | 0.03 | 0.03 | 0.28 | 0.67 |
| 1200 | 0.75 | 0.51 | 0.39 | 0.83 | 0.71 |
| 1250 | 0.60 | 0.75 | 0.72 | 0.70 | 0.70 |
| 1300 | 0.72 | 0.74 | 0.73 | 0.73 | 0.61 |
| 1350 | 0.16 | 0.72 | 0.72 | 0.70 | 0.40 |
| 1400 | 0.09 | 0.29 | 0.28 | 0.52 | 0.10 |

The observed weight gains for the aluminum alloys of Table 4 were attributed to the growth of a primarily α-alumina ceramic, and this finding was confirmed by X-ray diffraction analysis as discussed below in relation to FIG. 9.

Figure 3:
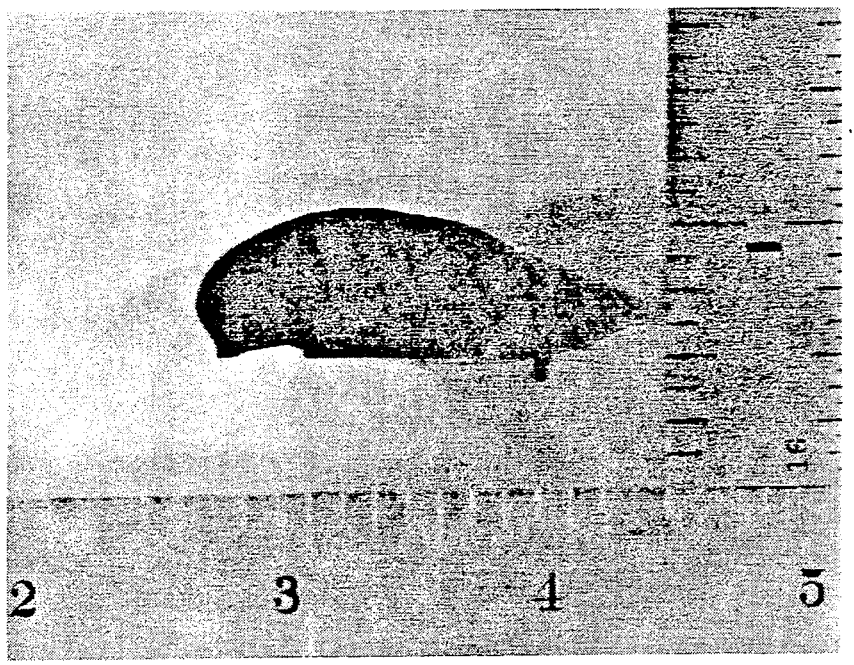
FIG. 3 is a photograph showing a cross-section of an α-alumina ceramic obtained from aluminum containing 2% magnesium and 10% silicon at a setpoint temperature of 1300° C., prepared according to Example 2.
Figure 6:
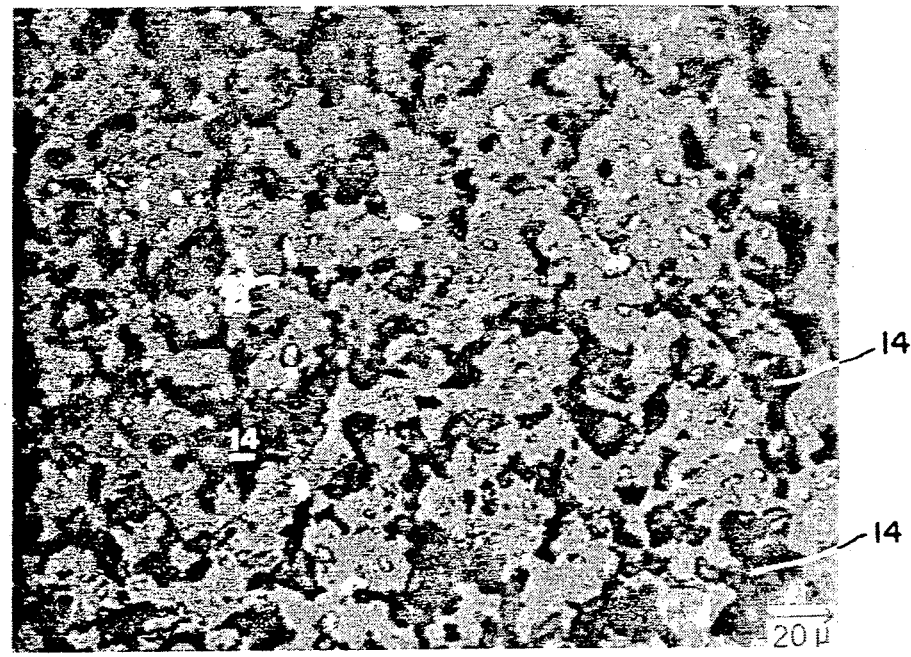
FIG. 6 is a photomicrograph of an α-alumina ceramic having an open cell porous structure obtained from aluminum containing 2% magnesium and 10% silicon at a setpoint temperature of 1300° C., prepared according to Example 2.

A photograph of a cross-section of the oxidation reaction product derived from 2% magnesium and 10% silicon at a setpoint temperature of 1300° C. is shown in FIG. 3. This microstructure contains 25–35 volume percent open cell porosity shown as 14 in FIG. 6.

Figure 5:
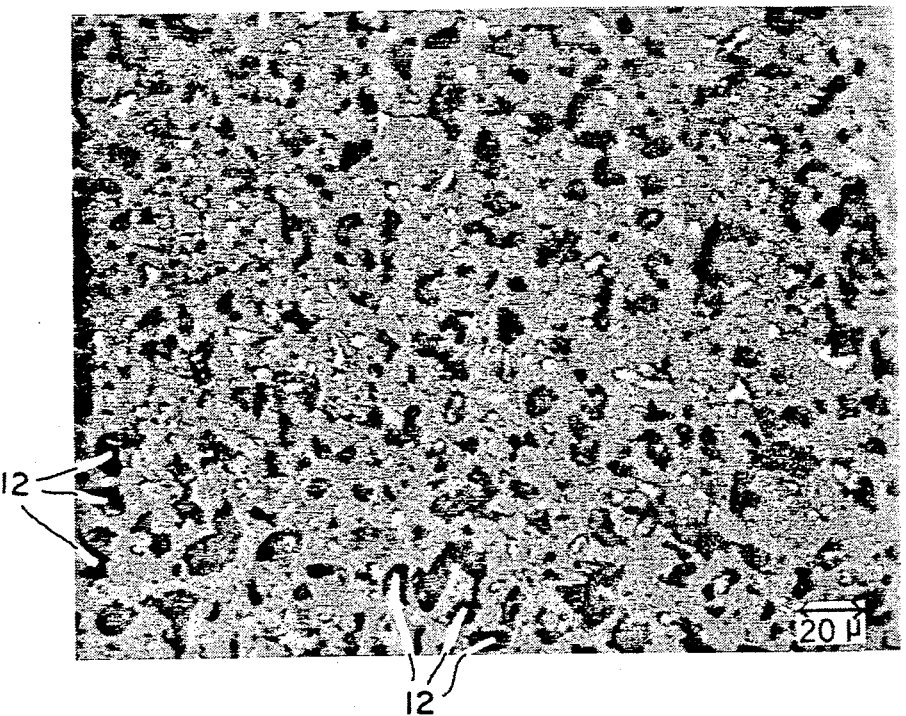
FIG. 5 is a photomicrograph of an α-alumina ceramic having a porous structure obtained from aluminum containing 2% magnesium and 3% silicon at a setpoint temperature of 1300° C., prepared according to Example 2.
Figure 8:
FIG. 8 is a photomicrograph of an α-alumina ceramic obtained from aluminum containing 2% magnesium and 3% silicon at a setpoint temperature of 1400° C., prepared according to Example 2.

The oxidation reaction product derived from 2% magnesium and 3% silicon at a setpoint of 1300° C. also illustrates a ceramic body having a porous structure. In FIG. 5 this structure, magnified 400 times, shows the interconnected metal inclusions replaced by voids due to metal transport. However, the non-interconnected metallic inclusions trapped within the polycrystalline oxide structure are not transported and remain in tact. FIG. 8 shows an extreme morphological growth variation for this product at a setpoint of 1400° C.

Figure 7:
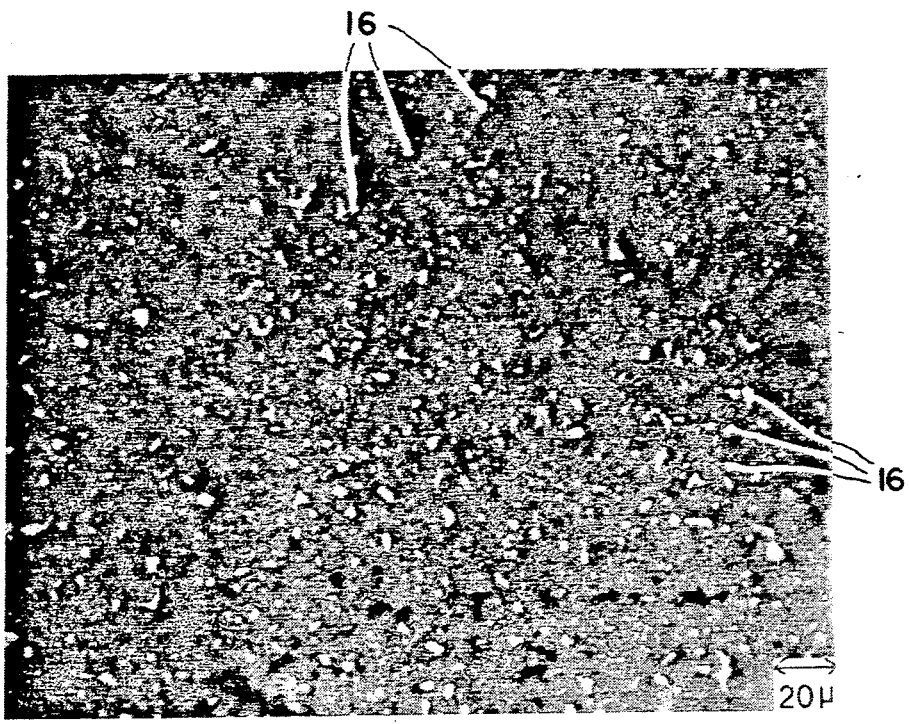
FIG. 7 is a photomicrograph of an α-alumina ceramic having a partly dense and partly porous structure obtained from aluminum containing 2% magnesium and 5% silicon at a setpoint temperature of 1350° C., prepared according to Example 2.

FIG. 7 is a photomicrograph of the α-alumina product derived from 2% magnesium and 5% silicon at a setpoint of 1350° C. showing a microstructure with very small metallic inclusions 16.

The furnace runs of this example also included aluminum ingots having no added magnesium and 3% silicon or ingots of commercially pure 1100 Al alloy (99% pure). The results of this study are listed in Table 5.

TABLE 5

| Weight Gain Ratios | | | | | | | |
|---|---|---|---|---|---|---|---|
| Aluminum (No Mg) | Temperature: °C. | | | | | | |
| | 1125 | 1150 | 1200 | 1250 | 1300 | 1350 | 1400 |
| 3% Silicon | 0.00 | −0.03 | −0.01 | −0.05 | −0.06 | −0.05 | −0.08 |
| 1100 Al | 0.00 | 0.00 | −0.00 | −0.03 | −0.03 | −0.06 | −0.03 |

The data in Tables 4 and 5 again indicate that magnesium has an effect on α-alumina growth; no weight gain or α-alumina growth was observed in the absence of Mg even when silicon was present at a concentration of 3%.

Figure 2:
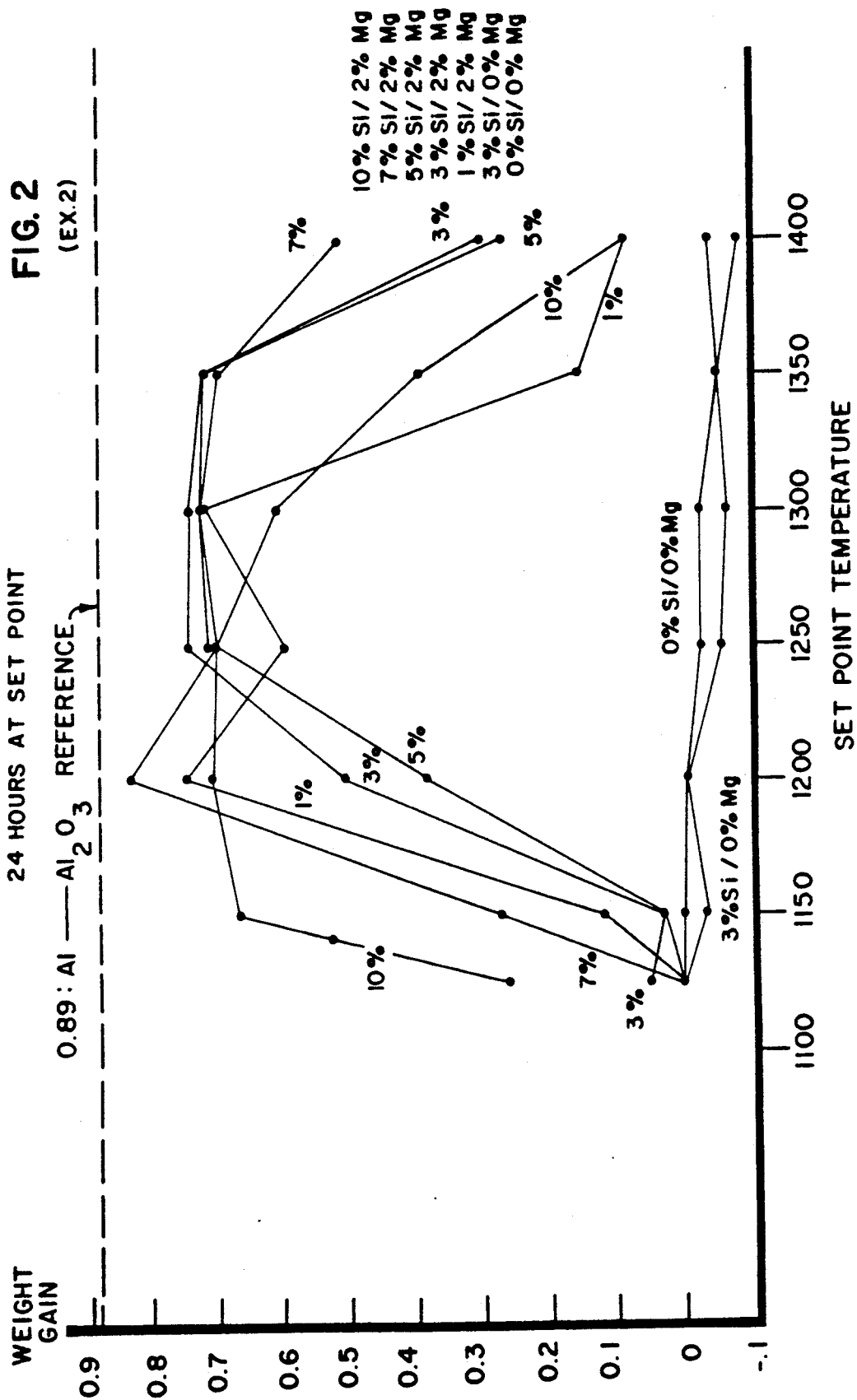
FIG. 2 is a graph depicting weight gain ratios for an α-alumina ceramic obtained from aluminum containing 2% magnesium and 1-10% silicon at selected setpoint temperatures, prepared according to Example 2.

A graphic illustration of the weight gain ratios for all aluminum samples of this Example 2 is shown in FIG. 2.

Certain of the α-alumina products were tested for hardness (Rockwell A hardness) and electrical resistance, the latter measured on for a ½ inch square by one inch long bar. The results of this study are listed in Tables 6 and 7.

TABLE 6

| Rockwell A Hardness | | | | | | |
|---|---|---|---|---|---|---|
| Aluminum (99.7% Pure) 2% Mg and 1–10% Si | Temperature: °C. | | | | | |
| | 1125 | 1150 | 1200 | 1250 | 1300 | 1350 |
| 10% Silicon | 68.5 | 52 | 63.6 | 70.3 | 71.5 | 78.0 |
| 7% Silicon | — | — | 66.0 | 73.4 | 75.3 | 81.7 |
| 5% Silicon | — | — | — | 76.7 | 72.3 | 81.0 |
| 3% Silicon | — | — | — | 70.4 | 76.0 | 83.3 |
| 1% Silicon | — | — | — | 74.4 | 77.8 | — |

TABLE 7

| Electrical Resistance; MOhm (Ohm) | | | | | | |
|---|---|---|---|---|---|---|
| Aluminum (99.7% Pure) 2% Mg and 1–10% Si | Temperature: °C. | | | | | |
| | 1125 | 1150 | 1200 | 1250 | 1300 | 1350 |
| 10% Silicon | <05 (Ohm) | >100 | >100 | >100 | >100 | >100 |
| 7% Silicon | — | — | >100 | >100 | >100 | >100 |

TABLE 7-continued

| Aluminum (99.7% Pure) | Electrical Resistance: MOhm (Ohm) | | | | | |
|---|---|---|---|---|---|---|
| | Temperature: °C. | | | | | |
| 2% Mg and 1-10% Si | 1125 | 1150 | 1200 | 1250 | 1300 | 1350 |
| 5% Silicon | — | — | — | >100 | >100 | >100 |
| 3% Silicon | — | — | — | >100 | >100 | >10–100 (Ohms) |
| 1% Silicon | — | — | — | >100 | >100 | — |

The hardness and conductivity data for the samples described in Tables 6 and 7 give evidence of their usefulness in manufacturing ceramic products where durability and electrical conductivity or resistively are required attributes.

Figure 4:
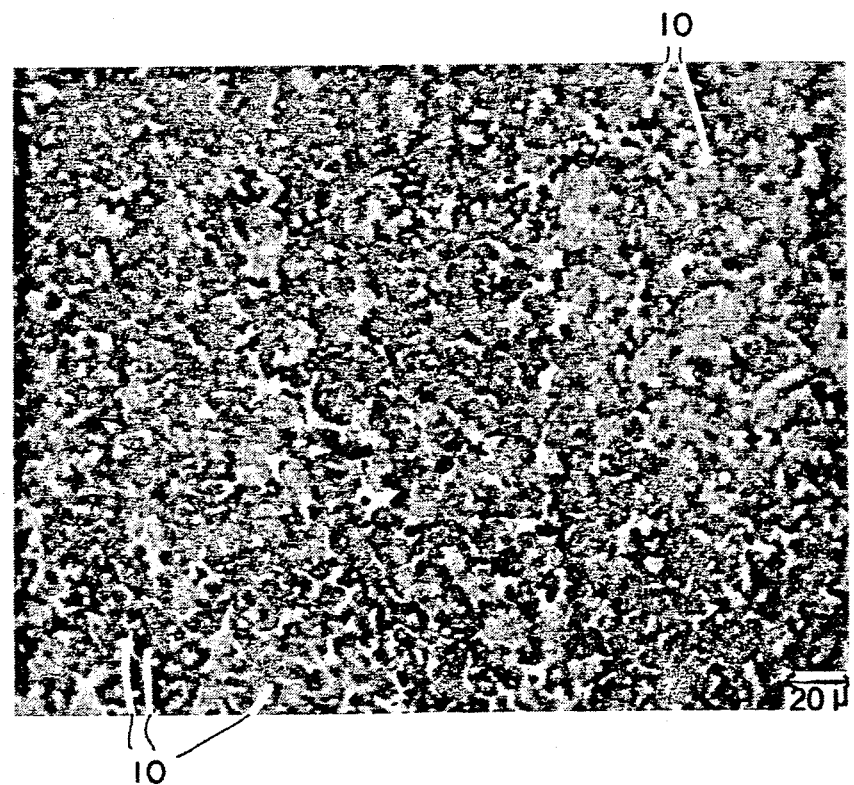
FIG. 4 is a photomicrograph of an α-alumina ceramic having a dense, low-porosity structure obtained from aluminum containing 1% silicon and 2% magnesium at a setpoint temperature of 1150° C., prepared according to Example 2.

The photomicrograph of FIG. 4 exemplifies one embodiment of this invention. Specifically, FIG. 4 depicts the non-porous structure of the α-alumina ceramic product obtained from aluminum with 2% magnesium and 1% silicon added and fired at 1150° C.

Figure 9A:
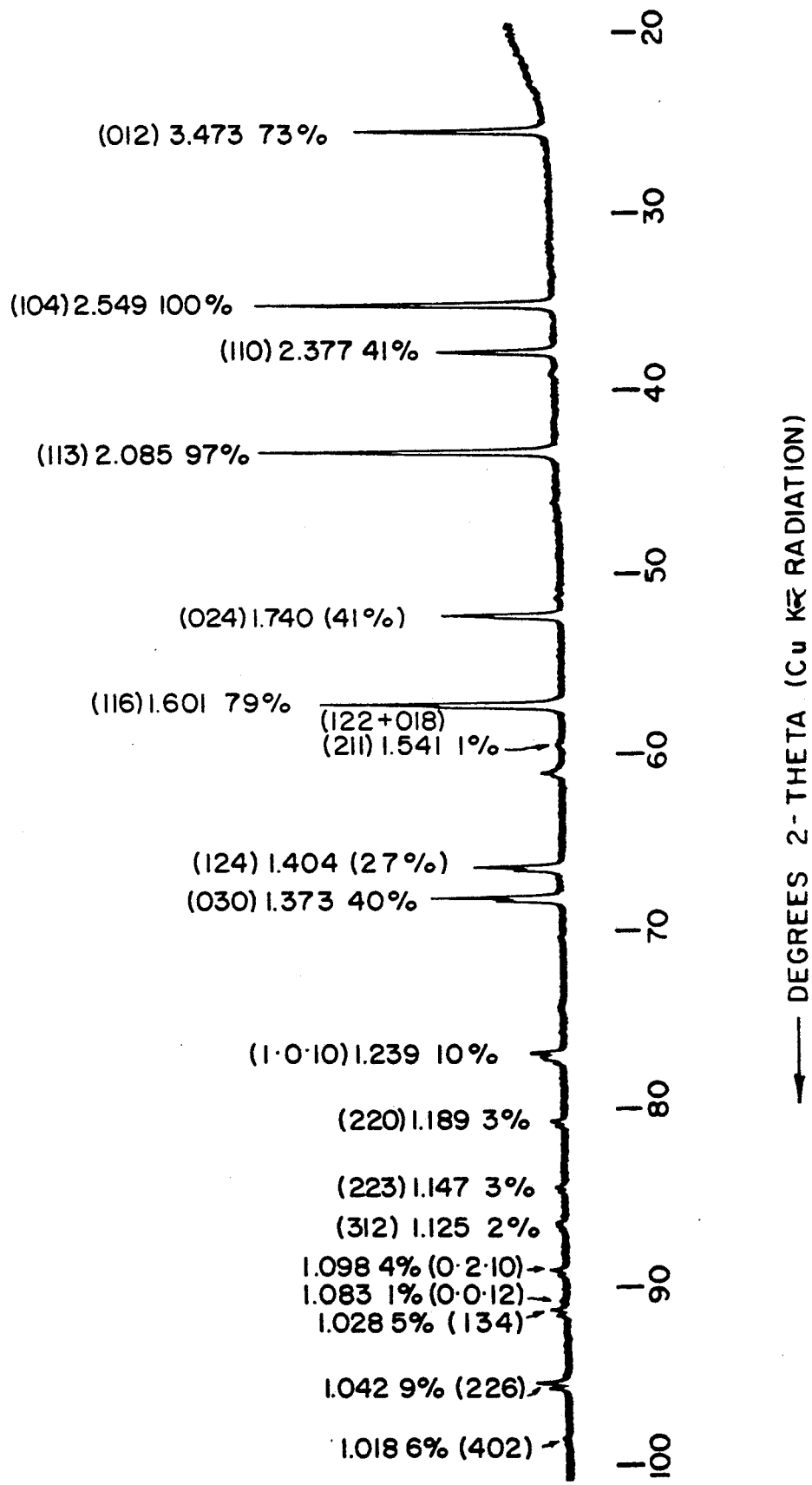
Figure 9B:
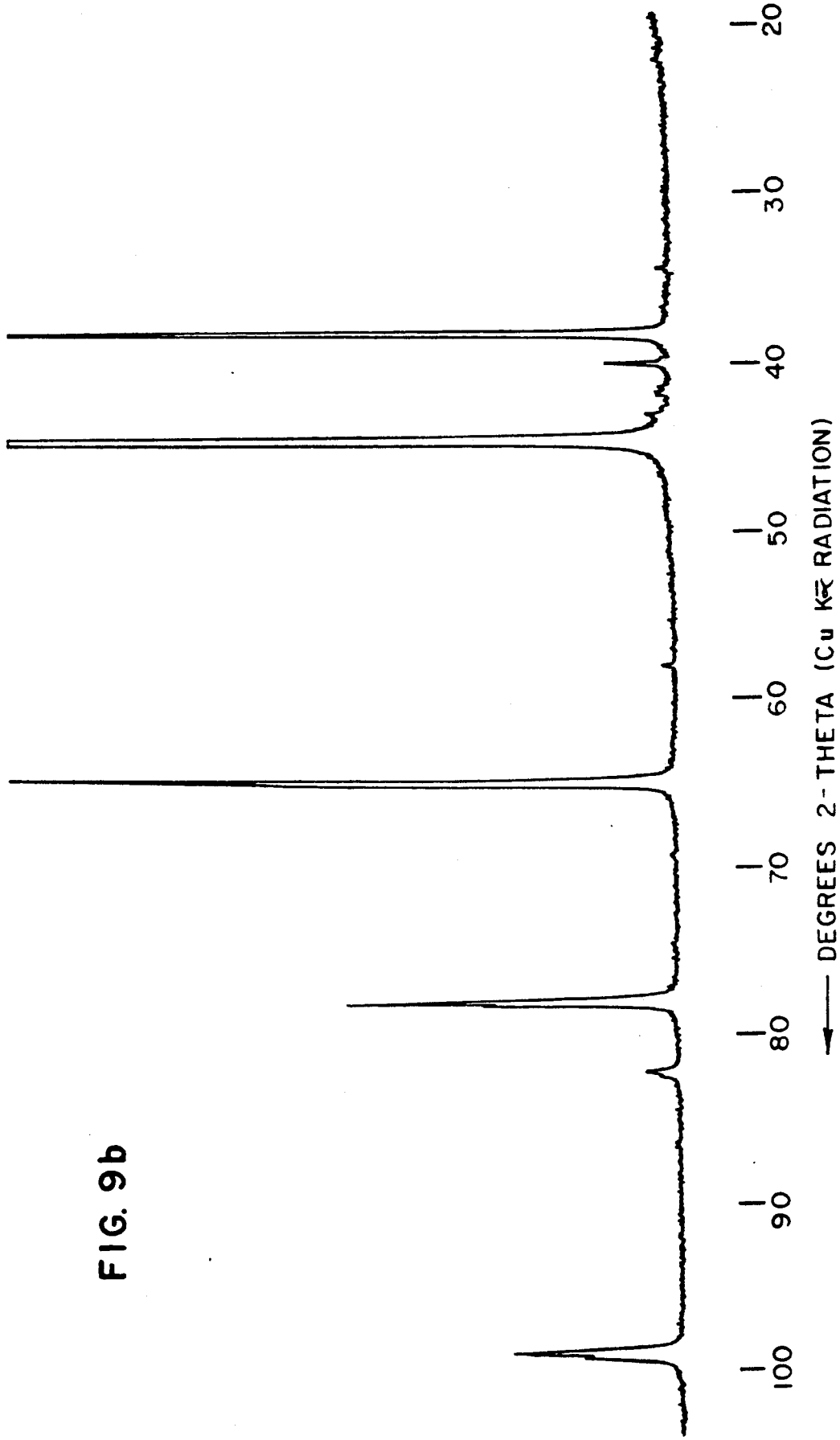

FIGS. 9a, 9b, and 9c provide a comparison of X-ray diffraction patterns for alpha $Al_2O_3$ (Corundum), elemental aluminum and an alumina product prepared according to this invention, respectively. When compared against FIGS. 9a and 9b, the diffraction pattern of FIG. 9c confirmed the presence of an α-alumina/aluminum product obtained from elemental aluminum.

On the basis of this data, it also has been concluded that the process of this invention produces ceramic structures which are relatively dense if the growth process is not conducted beyond the point where the parent metal has been exhausted.

EXAMPLE 3

α-Alumina Ceramic; Effect of Silicon Concentration (with Magnesium)

An ingot of 5052 aluminum alloy, containing nominally 2.4% magnesium and no more than 0.5% silicon and iron, was cut to a 2 by 9 by 0.5 inch sample, and this ingot was embedded in Norton El Alundum, 90 mesh (an alumina grain which, like 38 Alundum, provides an inert container for the molten aluminum under the described process conditions) in a refractory crucible.

The crucible and its contents were weighed, placed in a furnace and taken from room temperature to a processing setpoint temperature of 1250° C. in a ten hour period. Thereafter, the sample was processed in air for 48 hours at the setpoint temperature and cooled to room temperature within approximately ten hours.

Upon cooling, the crucible and its contents were again weighed and the weight gain ratio of the product was determined according to the procedure described in Example 1. The weight gain ratio for this product was 0.05 indicating negligible growth. This example, together with Examples 1 and 2, illustrates that for these process conditions neither magnesium nor silicon alone is effective as a dopant for the production of an α-alumina ceramic, but rather, magnesium and silicon are effective in combination.

EXAMPLE 4

α-Alumina Ceramic; Effect of Geraanium (with Magnesium)

Aluminum was alloyed with 3% magnesium and then further alloyed with 3% germanium and 5% germanium. The resulting alloys were cast into 1 inch diameter cylindrical ingots and cut to a length of ⅞ inch.

The ingots were embedded in Norton 38 Alundum, 220 mesh, in a refractory crucible, and these samples were processed to form aluminum oxide ceramic at process temperatures of 1200° C. and 1325° C. in air following the procedure described in Example 1.

The weight gain ratios for these aluminum/magnesium/germanium alloys were determined and the results are listed in Table 8, showing the beneficial effects of germanium dopant.

TABLE 8

| Aluminum (99.7% Pure) | Weight Gain Ratios | |
|---|---|---|
| | Temperature °C. | |
| 3% Mg: 3-5% Ge | 1200 | 1325 |
| 3% Germanium | 0.04 | 0.73 |
| 5% Germanium | 0.71 | 0.73 |

EXAMPLE 5

α-Alumina Ceramic; Effect of Tin (with Magnesium)

Aluminum was alloyed with 2% magnesium as the dopant and then further alloyed with tin at concentrations of 3%, 5% and 10%. The resulting alloys were cast into 1 inch diameter ingots and these were cut into ⅞ inch lengths.

The ingots thus obtained were processed into α-alumina ceramic products at process temperatures of 1200° C. and 1325° C. in air according to the procedure described in Example 1.

The weight gain ratios for these aluminum/magnesium/tin alloys were determined and the results are listed in Table 9, showing the beneficial effects of tin dopant.

TABLE 9

| Aluminum (99.7% Pure) | Weight Gain Ratios | |
|---|---|---|
| | Temperature °C. | |
| 2% Mg: 3-10% Sn | 1200 | 1325 |
| 10% Tin | 0.74 | 0.71 |
| 5% Tin | 0.56 | 0.22 |
| 3% Tin | 0.69 | 0.29 |

EXAMPLE 6

α-Alumina Ceramic; Effect of Lead (with Magnesium)

Aluminum alloys having the compositions shown in Table 10 were cast into ingots measuring 1 inch in diameter and 1 to 2.5 inches in length. The ingot samples were embedded in El Alundum, 90 mesh, in refractory crucibles with their respective top surfaces essentially flush to the surface of the aluminum oxide bed and exposed to the air.

The crucibles and their contents were weighed and heated in the presence of air for 48 hour periods at a 1250° C. setpoint temperature following which the samples were cooled within the furnace over a ten hour period to a temperature of less than 600° C.

Following the cooling step, the samples were removed from the furnace, the crucibles and their contents were weighed and their respective weight gain ratios were determined in the manner described in Example 1. The results of this study are listed in the following table.

TABLE 10

| Weight Gain Ratios at 1250° C. | | | |
|---|---|---|---|
| Aluminum (99.7% Pure) | | | Weight gain |
| % Mg | % Pb | % Sn | Ratio |
| 3% | 10 | 10 | 0.46 |
| 3% | 5 | — | 0.47 |
| 3% | 1 | — | 0.20 |
| 0% | 5 | — | 0.03 |

This study demonstrates as effective dopants the combinations of (a) magnesium, tin and lead and (b) magnesium and lead, for α-alumina production.

EXAMPLE 7

α-Alumina Ceramic; Effect of Impurities

To assess whether or not impurities may be tolerated, a commercial 6061 aluminum alloy was analyzed to show 1% magnesium, 0.6% silicon and trace amounts of the diluent or impurity species commonly found in aluminum alloys. These impurities and their concentrations were as follows:

| Diluent Metals | Weight % |
|---|---|
| Copper | 0.1 |
| Chromium | 0.2 |
| Iron | 0.3 |
| Manganese | 0.1 |
| Titanium | 0.2 |

The aluminum alloy was cut into a 2 by 9 by 0.5 inch plate and this sample was embedded in 38 Alundum (90 mesh) in a suitable refractory tray with a 2 by 9 inch surface substantially flush to the surface of the bed so that it remained exposed to air.

The alloy sample was placed in a furnace and heated in the presence of air to the processing setpoint temperature of 1325° C. within a four hour period. The sample was maintained for 30 hours at the setpoint temperature and then cooled to room temperature over a 10 hour period.

The weight gain ratio was 0.63, and this value is consistent with the weight gain ratios obtained for other higher purity aluminum alloy samples heated at identical setpoint temperatures over essentially identical periods.

As a result of this study, it was determined that the presence of minor amounts of metal diluents of the type generally found in aluminum alloys does not adversely affect to any great extent the formation of an α-alumina product of this invention.

EXAMPLE 8

α-Alumina Ceramic; Effect Of Zinc

Cylindrical metal ingots of different internally doped alloys, each one inch high by ⅝ inch diameter, were placed in beds of aluminum oxide (El Alundum, 90 mesh) such that the top circular surface was exposed and flush with the surface of the bedding. Each ingot was heated at a selected process temperature for 48 hours in air.

The above procedure was carried out at three separate process temperatures, 1125° C., 1250° C. and 1310° C. The weight gain ratios for the respective alloys are tabulated in Table 11 below.

TABLE 11

| | Doping with Zn and Mg or Si | |
|---|---|---|
| Alloy (Aluminum +) | Process Temperature | Weight gain ratio |
| 2% Zn/9% Si | 1125° C. | 0.009 |
| 2% Zn/2% Mg | 1125° C. | 0.023 |
| 2% Zn/9% /Si | 1250° C. | 0.010 |
| 2% Zn/2% Mg | 1250° C. | 0.480 |
| 2% Zn/9% Si | 1310° C. | 0.014 |
| 2% Zn/2% Mg | 1310° C. | 0.718 |

The above example illustrates that zinc in the presence of magnesium is effective as a dopant to promote the oxidation of aluminum to α-alumina particularly at the 1250° and 1310° C. process temperatures.

EXAMPLE 9

Aluminum Nitride Ceramic

An ingot of commercially available 380.1 aluminum alloy from Belmont Metals Inc. measuring ½ by ½ by 15/16 inches was embedded in a refractory crucible containing aluminum nitride powder (−100 mesh) which served as a bed only and not as a reactant. This alloy had a nominally identified composition by weight of 8-8.5% Si, 2-3% Zn and 0.1 Mg as active dopants, and 3.5% copper as well as iron, manganese and nickel, but the magnesium content was sometimes higher as in the range of 0.17-0.18%. An end face of the ingot was allowed to remain exposed above the surface of the powder.

Figure 11:
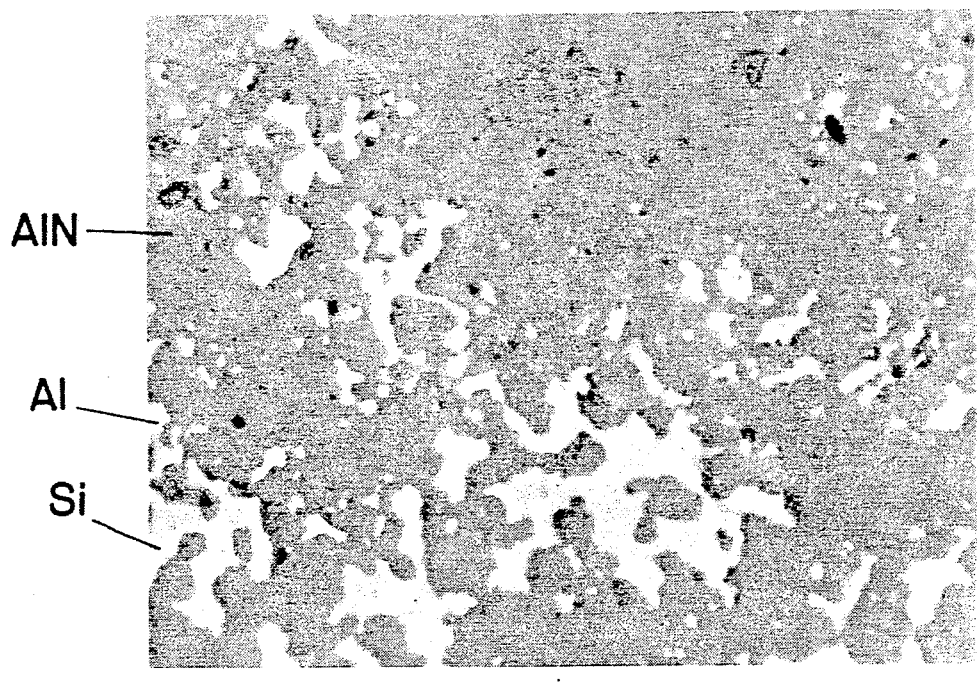
FIG. 11 is a photomicrograph of an aluminum nitride ceramic obtained from aluminum and forming gas, prepared according to Example 9, magnified 1000 times.

The crucible and its contents were weighed, and this material was placed into a radio frequency induction furnace and heated at about 1200° C. as measured by optical pyrometry for 2 hours in a forming gas atmosphere comprising 96 volume percent nitrogen and 4 volume percent hydrogen which flowed at 200 cc/min. The aluminum nitride reaction product grew primarily toward the forming gas atmosphere with negligible growth toward the bed, and the molten aluminum did not penetrate the aluminum nitride bed to any great extent. The photomicrograph of FIG. 11 shows the microstructure of the aluminum nitride ceramic produced according to this procedure. The presence of aluminum nitride and aluminum in the ceramic product was confirmed by X-ray diffraction analysis.

The resulting weight gain ratio of 0.26 represents significant conversion to aluminum nitride (full conversion of Al and AlN would give a 0.52 weight gain ratio).

EXAMPLE 10

Aluminum Nitride Ceramic

Example 9 was repeated using a different bedding material. In this case a 380.1 aluminum ingot which measured 1 by 0.5 by 0.5 inches was embedded in 38 Alundum (90 mesh) in a refractory crucible with one face of the ingot exposed to the atmosphere. The crucible and its contents were placed into a radio frequency induction furnace and heated in forming gas at about 1200° C. for 7 hours.

The weight gain ratio for the system in this example was 0.23 indicating the formation of aluminum nitride. This example showed that aluminum nitride could be grown independent of any requirement of an aluminum nitride bed.

EXAMPLE 11

Aluminum Nitride Ceramic

To illustrate the lack of growth of aluminum nitride ceramic in the absence of a dopant material, Example 10 was repeated with a cylindrical ingot of pure aluminum (99.7% pure) embedded in alumina particles (38 Alundum) such that the top circular surface was exposed and substantially flush with the surface of the bed in a refractory crucible. The crucible containing the ingot and bedding were heated to a process setpoint temperature of about 1200° C. for four hours in an atmosphere of forming gas (96% nitrogen, 4% hydrogen) flowing at a rate of 400 cc/min. The growth observed was negligible.

The above example in conjunction with Example 10 illustrates under the above process conditions the importance of the dopant or dopants to obtain significant growth of aluminum nitride.

EXAMPLE 12

Aluminum Nitride Ceramic

The procedure of Example 9 was repeated except that the sample therein described was replaced by an aluminum ingot alloyed to contain 10% silicon. This procedure was conducted in the presence of forming gas.

The weight gain ratio for the aluminum nitride product was 0.42, indicating that silicon alone can be employed beneficially as a dopant for this system.

EXAMPLE 13

Silicon Carbide Ceramic

Random size silicon chips (98.5% pure) were placed in a boron nitride crucible, and heated in a radio frequency induction furnace, using direct coupling to the silicon, at a setpoint temperature of about 1500° C. for 5 hours. The heating step was conducted in an atmosphere of 90% argon/10% methane which flowed over the crucible at a rate of 250 cc/minute.

Figure 12:
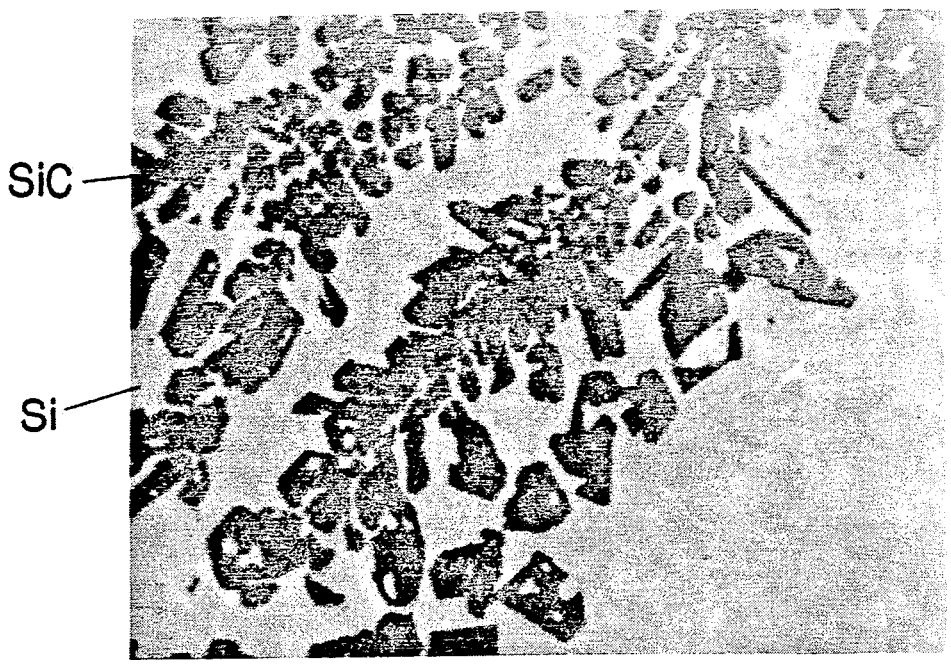
FIG. 12 is a photomicrograph of a silicon carbide ceramic prepared according to Example 13, magnified 200 times.

The weight gain ratio for the above described system was 0.27 (theoretical for complete conversion to SiC: 0.43) which was identified by X-ray diffraction as resulting from the growth of a silicon carbide ceramic. A photomicrograph of this product magnified 200 times appears in FIG. 12.

EXAMPLE 14

Tin Oxide Ceramic

Four cylindrical ingots of tin alloyed with 7% by weight of magnesium, each nominally 1.1 inch diameter by 0.87 inch long, were embedded in (−75+100 mesh) α-alumina in an alumina refractory crucible. The metal ingots were positioned in the beds such that one end of the ingot was exposed directly to the atmosphere.

The crucibles containing the ingots and bedding were heated in air over a period of 5½ hours to an 1100° C. setpoint temperature and held at 1100° C. for 1, 12, 24, and 36 hours, followed by removal from the furnace and rapid cooling to ambient. Tin dioxide was identified as the oxidation reaction product by X-ray powder diffraction.

The resulting weight gain ratios for the four ingots above are tabulated in Table 12 below.

TABLE 12

| Exposure time at Setpoint (hr.) | Weight gain ratio |
| --- | --- |
| 1 | .15 |
| 12 | .16 |
| 24 | .30 |
| 36 | .30 |

Complete conversion of metal to oxide (corrected in this case to include both the oxidation of tin and magnesium) would give a weight gain ratio of 0.30. The specimen exposed for 1 hour (from Table 12) was selected for further examination. A section through this specimen showed an outer layer of tin oxide over a layer approximately 1 cm thick of oxidation reaction product which contained both tin oxide and tin metal, the latter a characteristic feature of materials of this invention which have not been completely reacted.

The foregoing descriptions and examples show clearly the novelty and utility of the invention, and the several advantages of the process and product.

What is claimed is:

1. A self-supporting ceramic body comprising: (1) a three-dimensionally interconnected ceramic matrix consisting essentially of α-alumina and comprising about 65–85 volume percent of said ceramic body, and said ceramic matrix displaying a columnar macrostructure having a substantially hexagonal cellular pattern, said cellular pattern boundaries being substantially normal to the vertical axis of the columnar macrostructure; and (2) a three-dimensionally interconnected metallic phase comprised predominantly of aluminum, said metallic phase comprising about 15–35 volume percent of said ceramic body.

2. A self-supporting ceramic body comprising a three-dimensionally interconnected ceramic matrix comprised predominantly of aluminum nitride and a three-dimensionally interconnected metallic phase comprised predominantly of aluminum, said metallic phase comprising about 1–9 volume percent of said ceramic body.

3. A self-supporting ceramic body comprising a three-dimensionally interconnected ceramic matrix consisting essentially of at least one oxidation reaction product of tin and an oxidant and a three-dimensionally interconnected metallic phase comprised predominantly of tin.

* * * * *